(12) United States Patent
O'Meara

(10) Patent No.: US 6,384,491 B1
(45) Date of Patent: May 7, 2002

(54) ACTIVE ENERGY HOLD UP FOR POWER SUPPLIES

(75) Inventor: Kevan O'Meara, Chatsworth, CA (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/728,236

(22) Filed: Dec. 2, 2000

Related U.S. Application Data

(60) Provisional application No. 60/168,593, filed on Dec. 2, 1999.

(51) Int. Cl.$^7$ .................................................. H02J 1/00
(52) U.S. Cl. ........................................................ 307/86
(58) Field of Search .................. 363/21.14, 21.12, 363/21.18, 21.17, 89; 307/86, 87, 80

(56) References Cited

U.S. PATENT DOCUMENTS 5,220,492 A    6/1993  Rubin et al. ................. 363/97
5,225,767 A    7/1993  Gulczynski ................. 323/282
5,923,551 A *  7/1999  Deloy .......................... 363/142

* cited by examiner

*Primary Examiner*—Shawn Riley
(74) *Attorney, Agent, or Firm*—Lewis B. Sternfels

(57) ABSTRACT

A bi-directional flyback converter (30), as regulated by control circuitry (34), is used to maintain power from a capacitor (36) to aircraft electronics (20) when power from a ground source through bus (12) is switched by a switching relay (16) to the aircraft source through bus (14). When the aircraft is on the ground and prior to engine start up, power is fed through bus (12). Such maintenance of power is necessary during switch-over from the ground to the aircraft power source, to avoid any transitory interruption of power. In operation, once the proper voltage is reached, the circuit turns off, minimizing power consumption. When the input power drops, the bi-directional converter acts as a voltage source, keeping the supply input voltage at a minimum set point by using the energy stored in the capacitor. An anticipation circuit turns on the circuit before power is actually needed so that the response time is instantaneous.

12 Claims, 3 Drawing Sheets

ACTIVE ENERGY HOLD UP FOR POWER SUPPLIES

CROSS-REFERENCE TO RELATED APPLICATION

This application claims the benefit of U.S. Provisional Application No. 60/168,593, filed Dec. 2, 1999.

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to an active energy hold up for power supplies and, more particularly, to an apparatus for preventing loss of power to electronic components during an interruption or drop in power.

2. Description of Related Art and Other Considerations

While the present invention was developed specifically for use in power supplies for aircraft, it is as applicable to other vehicles, such as automobiles, trucks, tanks, and the like. Therefore, while the subsequent exposition discusses aircraft, it is to be understood that the invention is likewise applicable to such other vehicles.

Power is frequently required to be supplied to electronic components, even during a momentary loss of input power or "drop out" so that they will perform continuously and not be exposed to even a fleeting interruption. For example, a computer could easily shut down as a result of such an interruption and would required to be rebooted, during which time it would not be able to perform and possibly cause damage or other problems to the aircraft or its components. Similar damage or other problems result from a drop in power, for example, with a load coming onto line. This power drop would produce the same effects as an interruption in power. Therefore, an energy storage element of some form, e.g., a capacitor, is often used in concert with the power supply.

Three prior art methods are used to prevent loss of power to electronic components during an interruption or drop in power.

The most common method is to use a large capacitor bank on the input power to store energy, which is drawn upon when required.

Another method is to use a step up-step down topology (sometimes referred to as a "boost-buck") with a capacitor in between the power supply and the electronics.

A third method uses one circuit to charge up a capacitor, and another to discharge the capacitor when needed. The prior art has several disadvantages.

As depicted partly in FIG. 1, power from either power source is selectively fed by a switching relay 16 to a bus line 18 to aircraft electronic components, generally designated by indicium 20. When the aircraft is on the ground and prior to engine start up, power is fed through bus 12. Start up of the engines enables electric generators connected thereto to generate power, which are then used as the power source for the electronics. During switch-over from the ground to the aircraft power source, there is a transitory interruption of power, which passengers experience as a momentary flickering of lights in the passenger compartment.

In the above first-mentioned, most common method, the energy storage capability of the large capacitor bank is poorly utilized, on the order of under 10%; therefore, the capacitor must be very large.

The above second-mentioned or "boost-buck" method is illustrated in FIG. 1 and depicts a system 10 for maintaining an uninterrupted supply of power to aircraft electronic components when the source of power is switched from the ground power supply to the aircraft power supply, that is, through respective buses or lines 12 and 14.

A conventional method to avoid the occurrence of an interruption and drop in power employs the use of a step up converter 22 and a step down converter 24, which are coupled to a capacitor 26. A control 28 is connected to the converters to prevent them from operating at the same time. In operation, capacitor 26 is charged while power is supplied through either of busses 12 and 14. However, if power from the busses drops or is interrupted, capacitor 26 would have sufficient storage as to continue supply to electronics 20.

In this method, the overall efficiency of the supply is lowered by at least 10% by adding a series element in the boost stage through which power must flow. This solution must be integrated into the initial design of the supply. The boost stage must handle the full supply power and, accordingly, its size is significantly impacted.

Neither of the two methods allows the selection of a capacitor voltage rating that is independent of the input voltage based, in part, upon the reason that the energy storage density of the capacitor is a strong function of its rating voltage. This results in a lack of design freedom to choose the best capacitor, and is a serious disadvantage.

The above third-mentioned method adds two new switching regulators to the circuit and, therefore, makes it significantly more complex.

SUMMARY OF THE INVENTION

The present invention overcomes these and other problems by utilizing a bi-directional converter, preferably a flyback converter, and control circuitry to regulate the converter. Once the proper voltage is reached, the circuit turns off, minimizing power consumption. When the input power drops, the bi-directional converter acts as a voltage source, keeping the supply input voltage at a minimum set point by using the energy stored in the capacitor. An anticipation circuit turns on the circuit before power is actually needed so that the response time is instantaneous.

One or more advantages may be obtained by the present invention. It allows the maximum possible utilization of the energy storage capacitor, does not effect existing supply operation, allows substantially any capacitor to be used, and is simpler than other solutions with similar performance. The relative size of the energy storage element is decreased by almost twenty-five times over that of the prior art. The circuitry minimizes the size of the energy storage capacitor, so that the charge voltage is regulated at the optimum energy storage point of the capacitor, independent of the input voltage. A high voltage capacitor can be used and, accordingly, it can store more energy per unit volume than lower voltage capacitors. This also permits about 80% of the storage energy to be extracted from the capacitor, because the bi-directional power stage delivers a regulated output voltage as the capacitor voltage is dropping.

The hold-up power converter of the present invention itself need only be designed for intermittent action; thus, it need not be large. For example, the size of a specific converter utilized in a test circuit was 2 square inches by ½ inch in height, corresponding to a volume of approximately one cubic inch. Its small size did not affect the advantages summarized above.

The circuit does not affect the efficiency of the main power supply inasmuch as it operates only as required to charge to energy storage capacitor. No power elements are in series with the main flow of input power. Energy shuttling and hold up is done in parallel with the main power supply function.

Close to 100% utilization of the capacitor's energy storage potential allows any capacitor to be used. It is amenable to being added onto any existing or future supply. The invention power flows in parallel with the main power flow and, thus, only is required to handle the stored energy. This permits a freedom in design to choose the capacitor.

Other aims and advantages, as well as a more complete understanding of the present invention, will appear from the following explanation of an exemplary embodiment and the accompanying drawings thereof.

DETAILED DESCRIPTION OF THE PREFERRED EMBODIMENTS

Figure 1:
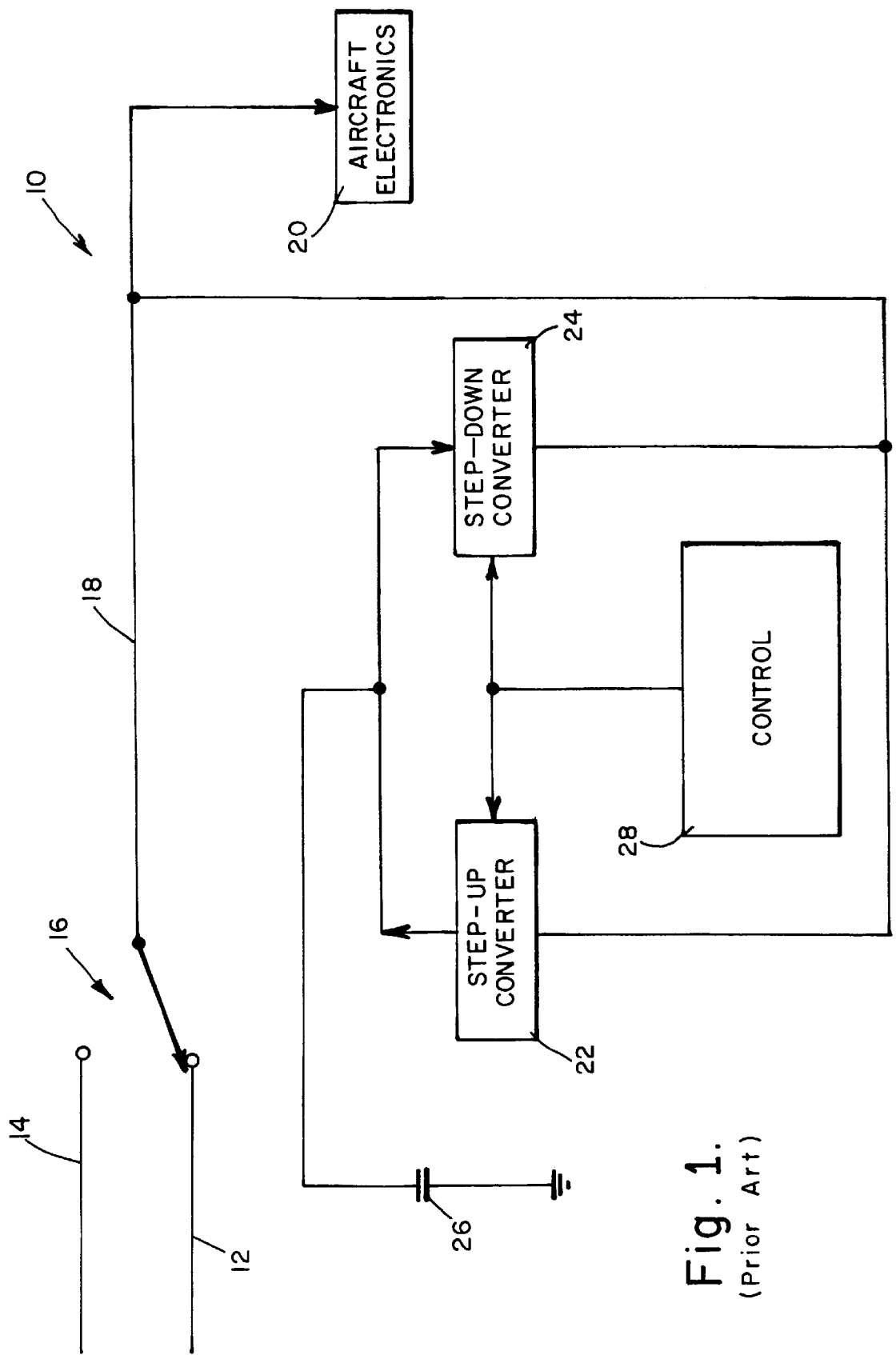
FIG. 1 is a block diagram of a currently used system for maintaining an uninterrupted supply of power to aircraft or other vehicular electronics during switching from a ground source of power to the aircraft power supply, employing a step up converter and a step down converter, and a control for preventing the two converters from simultaneous operation.
Figure 2:
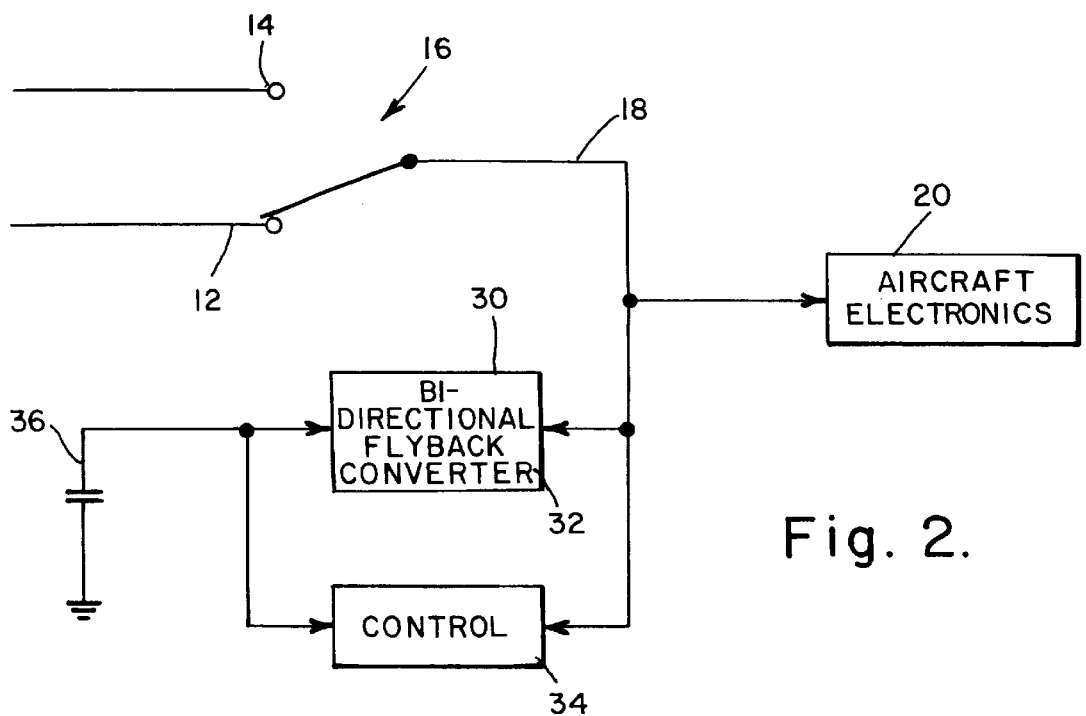
FIG. 2 is a block diagram of the system embodied in the present invention for maintaining an uninterrupted supply of power to aircraft electronics during switching from a ground source of power to the aircraft power supply, using a bi-directional flyback converter and a control therefor.
Figure 3:
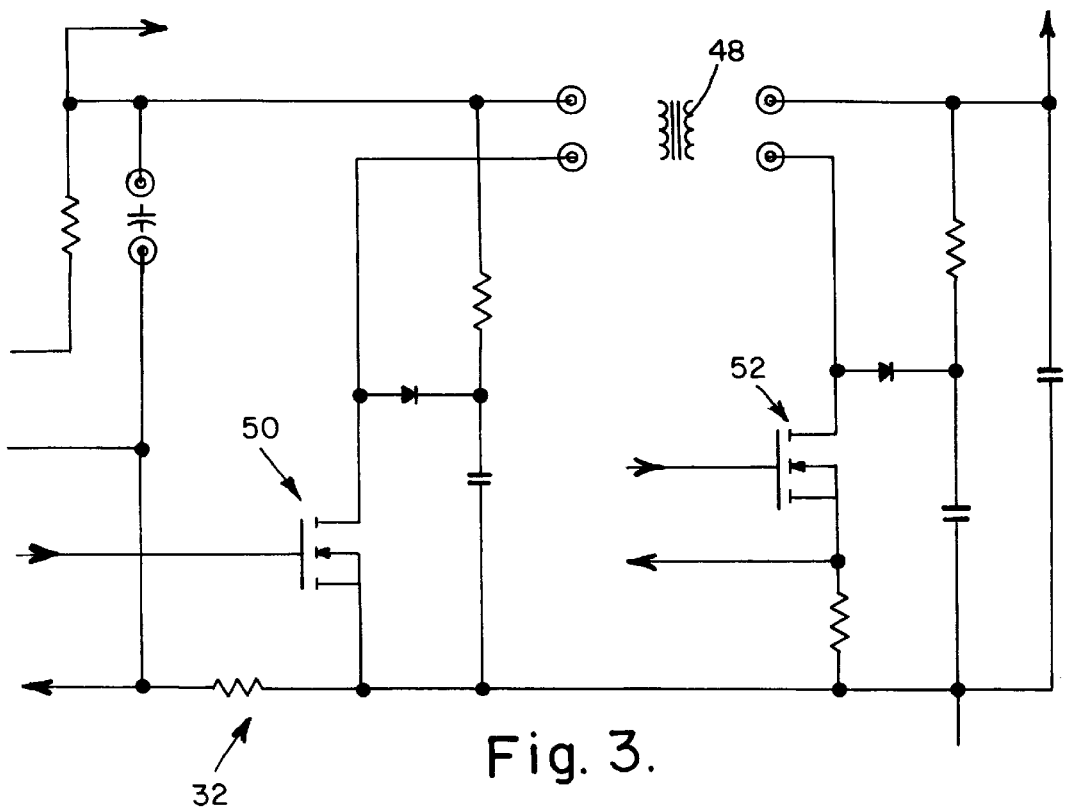
FIG. 3 is a circuit diagram of the bi-directional flyback converter shown in FIG. 2.

Referring to FIG. 2, a hold up circuit 30 of the present invention includes a bi-directional converter 32, preferably a bi-directional flyback converter, and a control 34, both of which are coupled to an energy storage capacitor 36. The energy storage capacitor is chosen for the best energy storage capability versus size, independent of the input power bus voltage. Bi-directional converter 32, as detailed in FIG. 3, is designed to transfer power in either direction, at any voltage, upon command.

Figure 4:
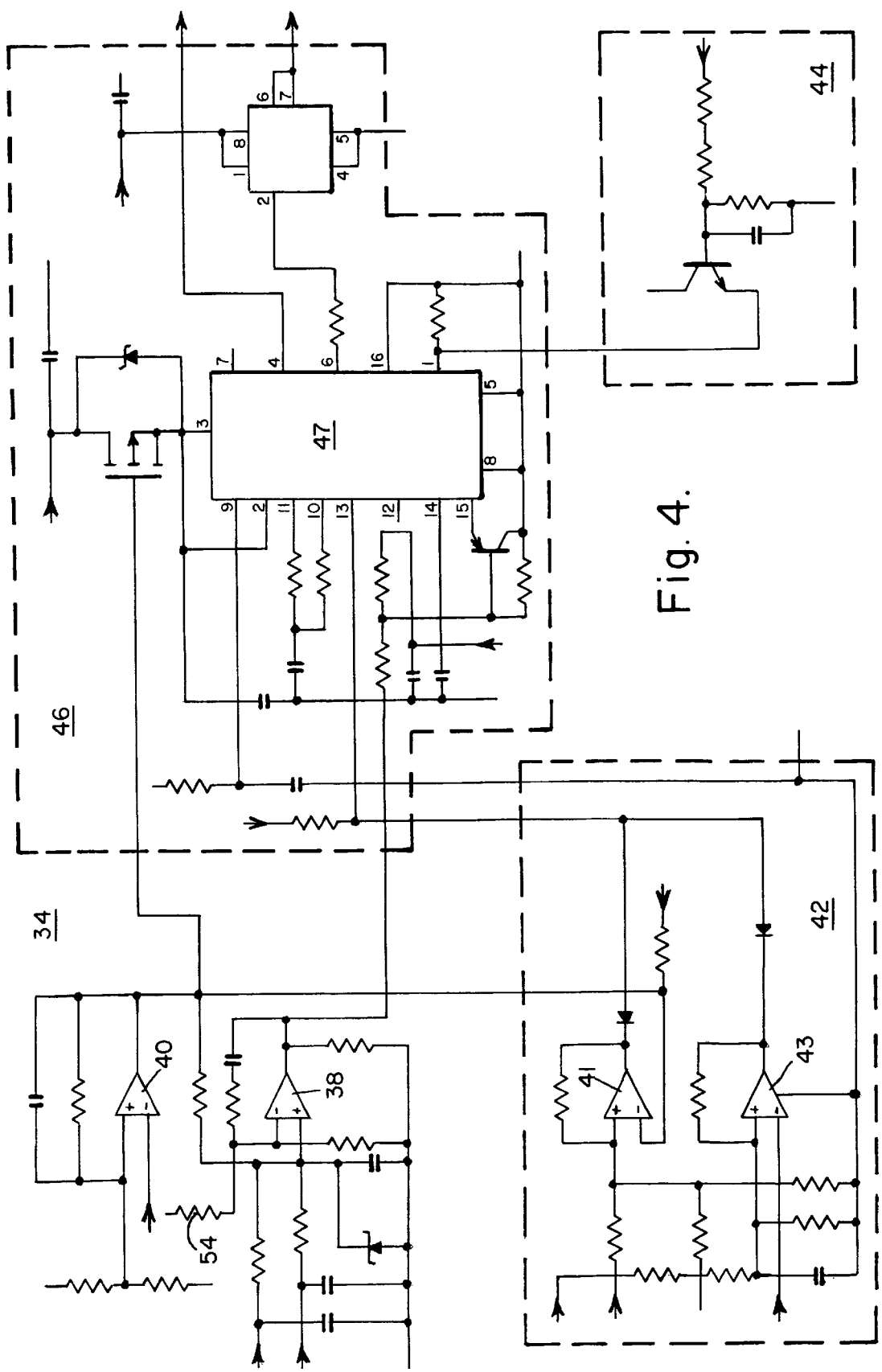
FIG. 4 is a circuit diagram of the control shown in FIG. 2.

Control 34 is illustrated in FIG. 4 and includes an average current sense amplifier 38, a voltage amplifier 40, power shut down circuitry 42, redundant voltage sensing circuitry 44 and a pulse width modulator (PWM) 46. Pulse width modulator 46 includes a pulse width modulator integrated circuit 47 which converts an analog signal into a pulse width whose duration is proportional to some control signal.

The several pins of circuit 47 are labeled, as follows:

| 1 | DELAY |
| 2 | LINE |
| 3 | VDD |
| 4 | OUT 1 |

-continued

| 5 | PGND |
| 6 | OUT 2 |
| 7 | CLK |
| 8 | GND |
| 9 | RAMP |
| 10 | OSC 2 |
| 11 | OSC 1 |
| 12 | EA OUT |
| 13 | EA IN |
| 14 | REF |
| 15 | SS |
| 16 | SHT DWN |

Circuit 47 has two outputs which are complements of each other and drive power field effect transistors 50 and 52 directly (shown in FIG. 3). Such an integrated circuit 47 is commonly used to control a switching regulated power supply. Average current sense amplifier 38 senses and regulates the current flow through the power stage. Voltage amplifier 40 programs the current amplifier to limit the output and input voltages. Power shut down circuitry 42 turns off the circuit when it is not being used in order to save power. Redundant voltage sensing circuitry 44 protects the energy storage capacitor against over voltage caused by circuit failures. Pulse width modulator (PWM) 46 operates to operates to provide the necessary interface from the other control circuitry and to provide drive signals to the two power FETs in the bi-directional converter. The particular pulse width modulator integrated circuit chosen has a complementary output stage (while one output is high the other is low) with a built in delay between the two outputs. Other pulse width modulator integrated circuits (IC's) or groups of integrated circuits can replace this particular device.

More specifically, energy storage capacitor 36 (shown in FIG. 2) is a single high voltage aluminum capacitor, so that it may be advantageously packaged in a rectangular configuration to maximize storage efficiency, and to be made available with a 125° C. rating.

The bi-directional power stage comprising flyback converter 32 has a typical 5:1 step-up ratio in its transformer 48. Each of the two (input and output) power field effect transistors 50 and 52 acts either as the secondary rectifier or the input main switch. Field effect transistors 50 and 52, when acting as a rectifier, operate in the synchronous mode, allowing discontinuous (negative ripple) current to flow. The stage is very symmetrical. Power may flow in either direction. Direction of power flow is controlled by the input voltage, the output voltage, and the duty cycle. The control of the power stage is done by a pulse width modulator integrated circuit, which provides a main output driver and a complementary output driver. Each output drives one switch, so that one switch is always on and one switch is always off.

Average current sense amplifier 38 senses the current flow through the power stage by monitoring the current of capacitor 36 and the 28 volt side switch current. These two currents are summed and filtered to create a continuous replica of the current flow through the power stage. The current is positive when current flow is from 28 volt bus 18 to energy storage capacitor 36 (charging), and negative when the capacitor is discharging back into the 28 volt bus (discharging). The output of current amplifier 36 controls the duty cycle of pulse width modulator integrated circuit 46 directly, so that the current may be programmed and regulated to a certain value.

Voltage amplifier 40 programs current amplifier 38 to limit the output and input voltage. The voltage amplifier operates in two modes. If the 28 volt input is low, the voltage amplifier output goes positive, causing the current amplifier to allow a constant negative current, and thereby regulating the 28 volts to a constant voltage. If the 28 volt input is high, the amplifier output goes very close to ground, which would program the current to zero. However, a single resistor, identified by indicium 54, programs a small constant positive current. This results in a constant value positive current charging the capacitor whenever the 28 volts is low. The voltage amplifier will not limit the capacitor voltage by itself; rather, it depends on the over voltage circuitry to shut off the power converter once the proper charge voltage is reached. The voltage amplifier loop response has low gain but wide bandwidth, because fast response time is needed; however, low accuracy can be tolerated.

Power shut down circuitry 42 uses two operational amplifiers, amplifiers 41 and 43, to monitor both the 200 volt storage on the capacitor, and the 28 volt input. If both are high, the power stage is switched off, saving power. The circuit automatically comes on when the storage capacitor itself discharges or the 28 volt input drops. This circuit also limits the charge voltage on the capacitor by turning off the power stage once the capacitor is charged.

The redundant voltage sensing circuitry protects the energy storage capacitor against over voltages caused by circuit failures. If the power shut down circuitry should fail, the capacitor could be charged to dangerously high voltages. This circuitry therefore operates independently of this circuit to turn off the 28 volt side field effect transistor while leaving the 200 volt side field effect transistor on.

As an illustration, the following example compares a design of a typical prior art arrangement with the design of the present invention to provide, in each case, 70 watts of hold up power.

For a typical prior art design:

16V minimum supply voltage operation (voltage after discharge)

50V maximum input voltage use a 75 voltage capacitor for derating energy hold up starting from 22 Vdc (charge voltage)

$$\text{Power} \times \text{HOLDUP} = \frac{1}{2} \times C\text{storage} \times (V\text{start}^2 - V\text{finish}^2)$$

Cstorage (storage capacity of the capacitor=0.032 farads To achieve this, twelve 75 volt, 2700 $\mu$Fd parts with a total volume of 31 in$^3$ must be used.

For the present invention design:

use 250 volt capacitor operate at 200 volts for derating assume bi-directional convertor regulates down to 60V Cstorage=206 $\mu$Fd Thus, a single half sized 250 volt, 220 $\mu$Fd part with a volume of 1.31 in$^3$ is usable.

Although the invention has been described with respect to a particular embodiment thereof, it should be realized that various changes and modifications may be made therein without departing from the spirit and scope of the invention.

What is claimed is:

1. An active energy hold up for enabling power to be continuously supplied to electronics without interruption during power switching of power from one power source to another power source, comprising:

an energy storage capacitor;

a bi-directional converter;

control circuitry coupled to said bi-directional converter and including switches, each arranged to bi-directionally transmit signals; and electrical coupling from said capacitor to the electronics through said bi-directional converter and said control circuitry.

2. An active energy hold up according to claim 1 in which said bi-directional converter comprises a bi-directional flyback converter.

3. An active energy hold up according to claim 1 wherein said bi-directional converter includes a pair of field effect transistors coupled in parallel to a transformer and having interconnections that enable said field effect transistors to act alternately as a secondary rectifier and as an input main switch, in which said field effect transistors, when acting as a rectifier, operate in synchronous mode to permit power to flow bidirectionally.

4. An active energy hold up for enabling power to be continuously supplied to electronics without interruption during power switching of power from one power source to another power source, comprising:

an energy storage capacitor;

a bi-directional converter including a pair of field effect transistors coupled in parallel to a transformer and having interconnections that enable said field effect transistors to act alternately as a secondary rectifier and as an input main switch, in which said field effect transistors, when acting as a rectifier, operate in synchronous mode to permit power to flow bidirectionally;

control circuitry coupled to said bi-directional converter and including an average current sense amplifier, voltage amplifier power shut down circuitry, redundant voltage sensing circuitry and a pulse width modulator; and electrical coupling from said capacitor to the electronics through said bi-directional converter and said control circuitry.

5. An active energy hold up for enabling power to be continuously supplied to electronics without interruption during power switching of power from one power source to another power source, comprising:

an energy storage capacitor;

a bi-directional converter including a pair of field effect transistors coupled in parallel to a transformer and having interconnections that enable said field effect transistors to act alternately as a secondary rectifier and as an input main switch, in which said field effect transistors, when acting as a rectifier, operate in synchronous mode to permit power to flow bidirectionally;

control circuitry coupled to said bi-directional converter and including an average current sense amplifier coupled to said capacitor for sensing the current flow through said bi-directional converter by monitoring the current of said capacitor and the side current from said field effect transistors when acting as a switch current whereby, when the two currents are summed and filtered, a continuous replica of the current flow is created through said bi-directional converter such that the current is positive when current is from the connection to the electronics and said capacitor, and negative when said capacitor is discharging back into the connection to the electronics; and electrical coupling from said capacitor to the electronics through said bi-directional converter and said control circuitry.

6. An active energy hold up according to claim 5 in which said control circuitry further includes a voltage amplifier and a resistor coupled to said current amplifier to program said current amplifier and thus to limit the output and input voltage thereto.

7. An active energy hold up according to claim 6 in which said voltage amplifier is constituted to operate in relatively low and high voltage input modes whereby, when the voltage input is low, said voltage amplifier output goes positive to cause said current amplifier to allow a constant negative current and thereby to regulate the voltage to a constant voltage and, when the voltage input is high, said amplifier output, under the effect of said resistor which provides a small constant positive current, goes very close to ground, to program the current to zero and, thereby, to result in a constant value positive current charging said capacitor whenever the voltage is low.

8. An active energy hold up according to claim 6 in which said control circuitry further includes power shut down circuitry comprising a pair o f operational amplifiers to monitor both the storage on said capacitor and the input voltage whereby, when both are high, the power stage is switched off to save power.

9. An active energy hold up according to claim 8 in which said control circuitry further includes redundant voltage sensing circuitry coupled to said current sense amplifier, said voltage amplifier and said power shut down circuitry, to protect said capacitor against over voltages caused by circuit failures.

10. An active energy hold up according to claim 9 in which said control circuitry further includes a pulse width modulator having outputs coupled to said field effect transistors for direct driving thereof.

11. A method for enabling power to be continuously supplied to electronics without interruption from at least two alternate sources of power during switching of power from one of the power sources to another of the power sources, comprising the steps of:

coupling control circuitry between a bi-directional converter and an energy storage capacitor; and coupling the capacitor to the electronics through the bi-directional converter.

12. A method for enabling power to be continuously supplied to electronics without interruption from at least two alternate sources of power during switching of power from one of the power sources to another of the power sources, comprising the steps of:

coupling control circuitry between a bi-directional flyback converter and an energy storage capacitor; and coupling the capacitor to the electronics through the bi-directional converter.

* * * * *